(12) United States Patent
Park et al.

(10) Patent No.: US 9,258,204 B2
(45) Date of Patent: Feb. 9, 2016

(54) METHOD AND APPARATUS FOR DECIDING NETWORK CODING METHOD BASED ON LINK UTILIZATION

(71) Applicant: Korea Advanced Institute of Science and Technology, Daejeon (KR)

(72) Inventors: Hong Shik Park, Daejeon (KR); Tae Hwa Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 145 days.

(21) Appl. No.: 14/173,663

(22) Filed: Feb. 5, 2014

(65) Prior Publication Data

US 2015/0188819 A1    Jul. 2, 2015

(30) Foreign Application Priority Data

Dec. 27, 2013 (KR) .................. 10-2013-0165265

(51) Int. Cl.
*H04L 12/26* (2006.01)
*H04L 12/811* (2013.01)

(52) U.S. Cl.
CPC ............ *H04L 43/0882* (2013.01); *H04L 47/38* (2013.01)

(58) Field of Classification Search
CPC ..... H04L 47/11; H04L 43/0882; H04L 47/10; H04L 47/125; H04L 49/50; H04L 49/501; H04L 47/38
USPC ......... 370/229, 230, 232, 234, 235, 237, 241, 370/248, 252, 310, 328, 338, 431, 437, 464, 370/465; 455/403, 422.1, 423, 461, 464
See application file for complete search history.

(56) References Cited

U.S. PATENT DOCUMENTS

| | | | |
|---|---|---|---|
| 2004/0071096 A1* | 4/2004 | Na et al. ..................... | 370/252 |
| 2004/0213174 A1* | 10/2004 | Engels et al. ................ | 370/328 |
| 2006/0153291 A1* | 7/2006 | Christison ................ | 375/240.01 |
| 2013/0051377 A1* | 2/2013 | Seferoglu et al. ............. | 370/338 |
| 2013/0080861 A1* | 3/2013 | Vyetrenko et al. ........... | 714/776 |

* cited by examiner

*Primary Examiner* — Obaidul Huq
(74) *Attorney, Agent, or Firm* — Marshall, Gerstein & Borun LLP

(57) ABSTRACT

A method and apparatus for deciding a network coding method based on link utilization are disclosed herein. The method may include a step of setting up an output link utilization reference value of a network intermediate node, a step of calculating an average utilization of output links for each network intermediate node, a step of deciding a network coding method in accordance with the average utilization of the output link for each network intermediate node, a step of consistently updating the average utilization of the output link for each network intermediate node, and a step of changing the network coding method, when a value of the average utilization value is changed.

18 Claims, 4 Drawing Sheets

METHOD AND APPARATUS FOR DECIDING NETWORK CODING METHOD BASED ON LINK UTILIZATION

This application claims the benefit of the Korean Patent Application No. 10-2013-0165265, filed on Dec. 27, 2013, which is hereby incorporated by reference as if fully set forth herein.

BACKGROUND OF THE INVENTION

1. Field of the Invention

The present invention relates to whether or not network coding is being operated in a network node and a method of applying network coding in order to minimize an increase in cost, delay, and complexity in accordance with an application of network coding

2. Discussion of the Related Art

Network coding refers to a technical method of compressing packets into one or more packets. Unlike a store-and-forward method, which corresponds to a transmission method of the conventional network node, the network coding method stores packets applied and introduced to the network node in a buffer. Then, until a transmission opportunity occurs in an output link, the network coding method compresses the packets, which are accumulated in the buffer, to one or more packets by using an encoding method. Thereafter, the network coding method transmits the one or more compressed packets.

A transmitting node of a network coding based network may or may not divide information that is to be transmitted to block units and combine the generated blocks by performing an encoding process. An internal network node combines packets, which are transmitted from the transmitting node and introduced to the internal network node, by performing an encoding process before transmitting the corresponding packets. Thereafter, the internal network node delivers the combined packets to a node connected to the internal network node. A final receiving node, which intends to receive content, receives a transmitted packet, which consists of a combination of multiple packets being combined by an encoding process. Accordingly, in order to recover information that is intended to be transmitted by the transmitting node, when sufficiently receiving a linearly independent packet, the receiving node may recover the initial (or original) information, which is transmitted by the transmitting node, by resolving a system of linear equations.

With respect to a flow of packets, which are encoded by a network intermediate node, the network coding method may be divided into Intra-session network coding and Inter-session network coding. Intra-session network coding corresponds to a method of encoding only packets belonging to the same flow, among a plurality of packets being flown into the network intermediate node, and transmitting the encoded packets. Herein, since the receiving node is more likely to receive linearly independent packets, Intra-session network coding is more advantageous in recovering the initial information. However, there are limitations in the Intra-session network coding method for achieving network-optimized transmission efficiency via network coding.

Inter-session network coding corresponds to a method of encoding packets belonging to different flows, among a plurality of packets being flown into the network intermediate node, and transmitting the encoded packets. Inter-session network coding corresponds to a coding method, which is applied to a network, wherein a plurality of flows is generated and transmitted in order to allow multiple transmitting nodes and receiving nodes to perform communication at the same time, such as the Internet, so as to resolve network congestion and to achieve network-optimized transmission efficiency via inter-flow network coding. However, the inter-session network coding method is disadvantageous in that the coding method is more complicated, as compared to the intra-session network coding method, and, since it is more difficult for the receiving node to sufficiently receive linearly independent packets for information recovery, the number of flows corresponding to encoding is limited.

Network coding technology may send out (or transmit) multiple network packets at the same time by combining the packets. Accordingly, by efficiently using network resources, the network coding technology may enhance network processing capacity, and, in bottleneck sections, the network coding technology may control network congestion. However, in order to apply network coding, a calculation procedure for performing the encoding operation between a transmitting node and a network intermediate node is required, which causes an increase in complexity. Additionally, the network coding technology also requires a storage space, which is configured to temporarily store packets, which correspond to encoding targets, and a calculating capability, which is required for recovering initial (or original) packets from a receiving node. Therefore, in order to apply the network coding technology to the current networks, the above-described disadvantages of the network coding technology are required to be resolved.

Intra-session network coding is advantageous in that the complexity level is relatively low and that the likelihood of recovering the initial content from the receiving node is high. However, intra-session network coding is disadvantageous in that the efficiency in using network resources is lower than the efficiency of the inter-session coding method. And, the inter-session coding method is theoretically advantageous in that it can achieve maximum transmission efficiency available in the network. However, the inter-session coding method is disadvantageous in that it has a high complexity level and that limitations are required to be made in the application environment in order to recover the initial content from the receiving node.

SUMMARY OF THE INVENTION

Accordingly, the present invention is directed to a method and apparatus for deciding a coding method based on link utilization that substantially obviates one or more problems due to limitations and disadvantages of the related art, which may occur when collectively applying one type of network coding method to the network.

An object of the present invention is to provide a method and apparatus for deciding a coding method based on link utilization that can maximize the network processing capacity by consistently deciding whether or not to apply network coding to the network node and by consistently deciding the network coding method that is to be applied, in accordance with the network situation, in order to reduce cost required for enhancing the performance of nodes for performing encoding and decoding when applying network coding to the network, ad to reduce cost for storage spaces, and so on.

In other words, the object of the present invention is to provide a method and apparatus for deciding a coding method based on link utilization that can reduce the cost for network coding by deciding which one of the store-and-forward method, which corresponds to the conventional transmission method, the intra-session network coding method and the inter-session network coding method, which correspond to the two different network coding methods, based upon traffic processing capacity and output link utilization of a network intermediate node, so as to partially apply network coding to some of the network nodes, instead of applying the network coding method to all nodes of the network, and to provide a method and apparatus for deciding a coding method based on link utilization that can reduce the cost for network coding by applying another network coding method in accordance with the output link utilization of a corresponding node, inorder to maintain the enhancement in the network processing amount when performing network coding and to reduce cost for applying network coding.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in an aspect of the present invention, a method for deciding a network coding method based on link utilization proposed in the present invention may include a step of setting up an output link utilization reference value of a network intermediate node, a step of calculating an average utilization of output links for each network intermediate node, a step of deciding a network coding method in accordance with the average utilization of the output link for each network intermediate node, a step of consistently updating the average utilization of the output link for each network intermediate node, and a step of changing the network coding method, when a value of the average utilization value is changed.

In the step of setting up an output link utilization reference value of a network intermediate node, a low threshold value and a high threshold value of the output link utilization of the network intermediate node may be set up, and the set up values may be notified to all network nodes.

In the step of calculating an average utilization of output links for each network intermediate node, the average utilization may be calculated by using the equation shown below:

$$\overline{u_i}(t) = \frac{1}{n} \sum_{j=1}^{n} \frac{v_{l_j}(t)}{c_{l_j}},$$

Herein i may represent a node, t may indicate a measurement time, n may represent a number of nodes, $c_{lj}$ may indicate a capacity of a $j^{th}$ output link being connected to node i, and $v_{lj}(t)$ may represent a traffic amount transmitted to the $j^{th}$ output link being connected to node i.

In the step of deciding a network coding method in accordance with the average utilization of the output link for each network intermediate node, if the average utilization value of the output link for each network intermediate node is smaller than a low threshold value, a coding method that does not adopt network coding may be applied.

The coding method that does not adopt network coding may correspond to a store-and-forward method.

In the step of deciding a network coding method in accordance with the average utilization of the output link for each network intermediate node, if the average utilization value of the output link for each network intermediate node is greater than a low threshold value and smaller than a high threshold value, since the traffic amount maintains an adequate state, a coding method encoding only packets that belong to the same flow may be applied.

The coding method encoding only the packets belonging to the same flow may correspond to an intra-session network coding method.

In the step of deciding a network coding method in accordance with the average utilization of the output link for each network intermediate node, if the average utilization value of the output link for each network node is greater than a high threshold value, a coding method controlling an excessive traffic amount may be applied.

The coding method controlling the excessive traffic amount may correspond to an inter-session network coding method.

The inter-session coding method may be applied when two or more traffic flows exist, and the intra-session network coding method may be applied when one traffic flow exists.

In the step of changing the network coding method, when a value of the average utilization value is changed, the network coding method may be changed by reflecting the average utilization of the output link for each network intermediate node, which is consistently updated, and by repeating the reflected average utilization in accordance with a pre-decided cycle period.

Each network intermediate node may independently decide the network coding method.

In another aspect of the present invention, an apparatus for deciding a network coding method based on link utilization proposed in the present invention may include a network managing unit configured to set up an output link utilization reference value of a network intermediate node and to notify the set up reference value to all network nodes, thereby controlling the network coding method, a transmitting node configured to newly encode initial content in order to perform network coding and to transmit the processed packet, an intermediate node configured to calculate an average utilization of an output link for each network intermediate node and to decide a network coding method after comparing the calculated average utilization with the reference value—the intermediate node receives the transmitted packet for a pre-decided period of time, divides the received packet based upon a flow, and, after encoding the divided packet, transmits the encoded divided packet, and a receiving node configured to receive the transmitted packet and to recover the initial content.

The intermediate node may further include a calculating unit configured to calculate an average utilization of the output link of each network intermediate node, and a coding method deciding unit configured to decide the network coding method by comparing the average utilization with the reference value.

The calculating unit may calculate the average utilization by using the equation shown below:

$$\overline{u_i}(t) = \frac{1}{n} \sum_{j=1}^{n} \frac{v_{l_j}(t)}{c_{l_j}},$$

Herein i may represent a node, t may indicate a measurement time, n may represent a number of nodes, $c_{lj}$ may indicate a capacity of a $j^{th}$ output link being connected to node i, and $v_{l_j}(t)$ may represent a traffic amount transmitted to the $j^{th}$ output link being connected to node i.

The coding method deciding unit may decide the network coding method in accordance with the average utilization of the output link of each network intermediate node.

The coding method deciding unit may apply a coding method that does not adopt network coding, if the average utilization value of the output link for each network intermediate node is smaller than a low threshold value.

The coding method that does not adopt network coding may correspond to a store-and-forward method.

The coding method deciding unit may apply a coding method encoding only packets that belong to the same flow, if the average utilization value of the output link for each network intermediate node is greater than a low threshold value and smaller than a high threshold value, since the traffic amount maintains an adequate state.

The coding method encoding only the packets belonging to the same flow may correspond to an intra-session network coding method.

The coding method deciding unit may apply a coding method controlling an excessive traffic amount, if the average utilization value of the output link for each network node is greater than a high threshold value.

The coding method controlling the excessive traffic amount may correspond to an inter-session network coding method.

The coding method deciding unit may apply the inter-session coding method when two or more traffic flows exist, and the coding method deciding unit may apply the intra-session network coding method when one traffic flow exists.

The calculating unit may consistently update the average utilization of the output link for each network intermediate node.

The coding method deciding unit may change the network coding method by reflecting the average utilization of the output link for each network intermediate node, which is consistently updated, and by repeating the reflected average utilization in accordance with a pre-decided cycle period.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
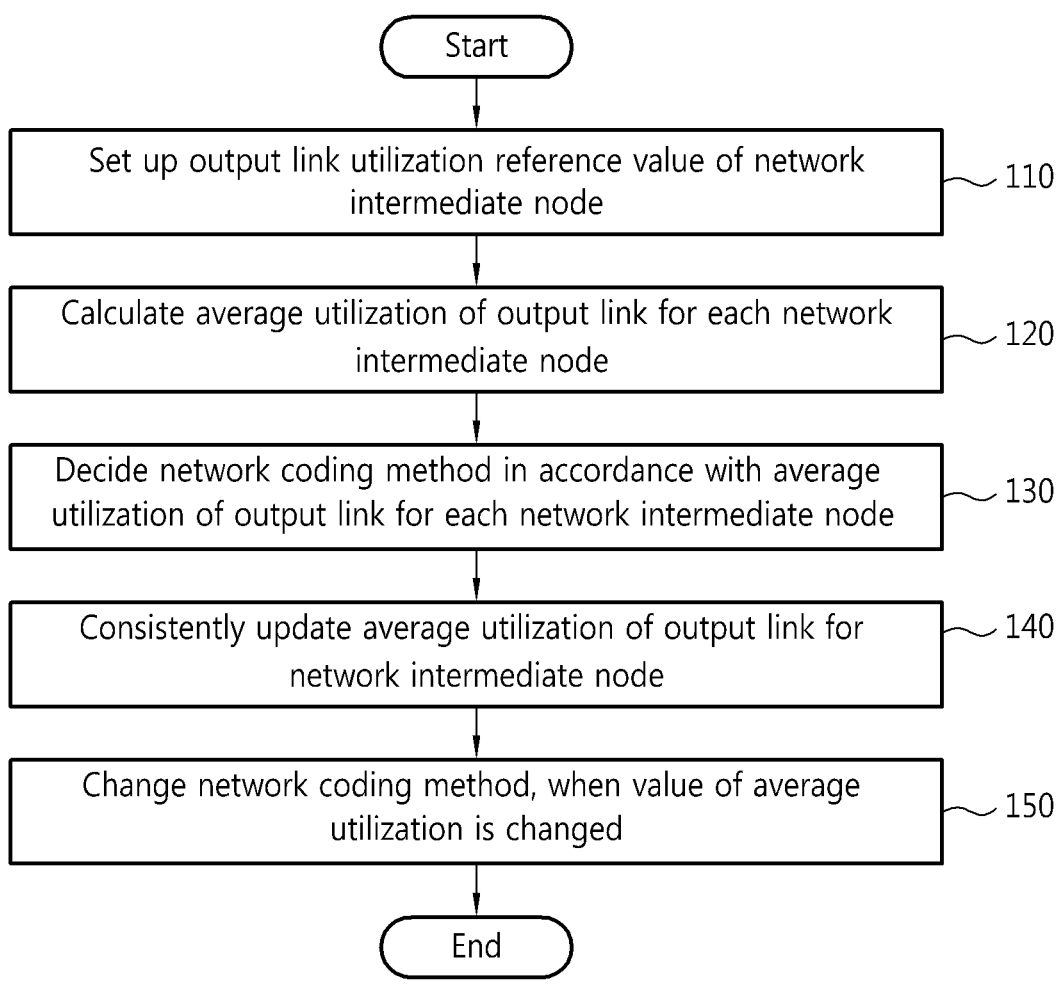
FIG. 1 illustrates a flow chart for describing a method for deciding a network coding method based on link utilization according to an exemplary embodiment of the present invention.

FIG. 1 illustrates a flow chart for describing a method for deciding a network coding method based on link utilization according to an exemplary embodiment of the present invention.

The method for deciding a network coding method based on link utilization may include a step of setting up an output link utilization reference value of a network intermediate node (110), a step of calculating an average utilization of output links for each network node (120), a step of deciding a network coding method in accordance with the average utilization of the output link for each network node (130), a step of consistently updating the average utilization of the output link for each node (140), and a step of changing the network coding method, when the average utilization value is changed (150).

In step (110), an output link utilization reference value of a network intermediate node may be set up. The output link utilization reference value of a network intermediate node may include a low threshold value and a high threshold value. The low threshold value and the high threshold value of the output link utilization of the network intermediate node may be set up, and, then, the set up values may be notified to all nodes of the network.

In step (120), an average utilization of the output link of each network node may be calculated.

At this point, the average utilization of the output link of each network node may be calculated by using Equation 1.

$$\overline{u_i}(t) = \frac{1}{n}\sum_{j=1}^{n}\frac{v_{l_j}(t)}{c_{l_j}} \qquad \text{Equation 1}$$

Herein, i may represent a node, t may indicate a measurement time, n may represent a number of nodes, $c_{l_j}$ may indicate a capacity of a $j^{th}$ output link being connected to node i, and $v_{l_j}(t)$ may represent a traffic amount transmitted to the $j^{th}$ output link being connected to node i.

In step (130), a network coding method may be decided in accordance with the average utilization of the output link for each network node. Among the set up reference values, if the average utilization value of the output link for each network node is smaller than the low threshold value, a coding method that does not adopt network coding may be applied. For example, the coding method that does not adopt network coding may correspond to a store-and-forward method. Additionally, among the set up reference values, if the average utilization value of the output link for each network node is greater than the low threshold value and smaller than the high threshold value, since the traffic amount maintains an adequate state, a coding method encoding only packets that belong to the same flow may be applied. For example, a coding method encoding only the packets belonging to the same flow may correspond to the intra-session network coding method. Furthermore, among the set up reference values, if the average utilization value of the output link for each network node is greater than the high threshold value, a coding method controlling an excessive traffic amount may be applied. For example, the coding method controlling the excessive traffic amount may correspond to the inter-session network coding method. At this point, when two or more traffic flows exist, the inter-session coding method may be applied. Conversely, when one traffic flow exists, the intra-session network coding method may be applied.

In step (140), the average utilization of the output link for each node may be consistently updated. By using Equation 1, the average utilization of the output link for each node may be consistently calculated, and the average utilization may be updated with the newly calculated value.

In step (150), if the average utilization value is changed, the network coding method may also be changed. If the average utilization of the output link for each node is consistently calculated, and if the average utilization value is changed accordingly, the network coding method may be changed in accordance with the changed average utilization value.

Figure 2:
FIG. 2 illustrates a conceptual view for deciding a step-by-step network coding method respective to an average output link utilization for each node according to the exemplary embodiment of the present invention.

FIG. 2 illustrates a conceptual view for deciding a step-by-step network coding method respective to an average output link utilization for each node according to the exemplary embodiment of the present invention.

Referring to FIG. 2, $u_{thL}$ 210 and $u_{thH}$ 220 respectively represent a low threshold value and a high threshold value of an output link utilization of a node. These values may each correspond to adequate values decided by a network manager. And, all network nodes may be notified such low threshold value and such high threshold value. Diverse network coding methods being applied in accordance with a threshold level based upon a utilization (u) value, which is measured in an output link of a node, will be described below.

If the utilization u value is smaller than $u_{thL}$ 210 ($u<u_{thL}$), since the amount of traffic being flown into (or introduced to) the node is not large, the traffic transmission efficiency of the network coding method is not high. And, therefore, a store-and-forward method 230, which does not adopt network coding, may be applied.

If the utilization u value is between $u_{thL}$ 210 and $u_{thH}$ 220 ($u_{thL} \leq u < u_{thH}$), since the amount of traffic being flown into the node is maintained at an adequate or greater state, an intra-session network coding method 240 may be applied. Herein, the intra-session network coding method corresponds to a comparatively less complicated coding method, which encodes only packets that belong to the same flow, and which has a higher likelihood of recovering initial (or original) information from the receiving node, and, therefore, the application of the intra-session network coding method causes less burden in the system.

If the utilization u value is greater than $u_{thH}$ ($u \geq u_{thH}$), the amount of traffic being flown into the node becomes too excessive, and, therefore, it becomes difficult for services to be provided smoothly. Accordingly, in order to control such congestion, an inter-session network coding method 250, which has a high level of complexity and a high transmission efficiency level, may be applied.

Figure 3:
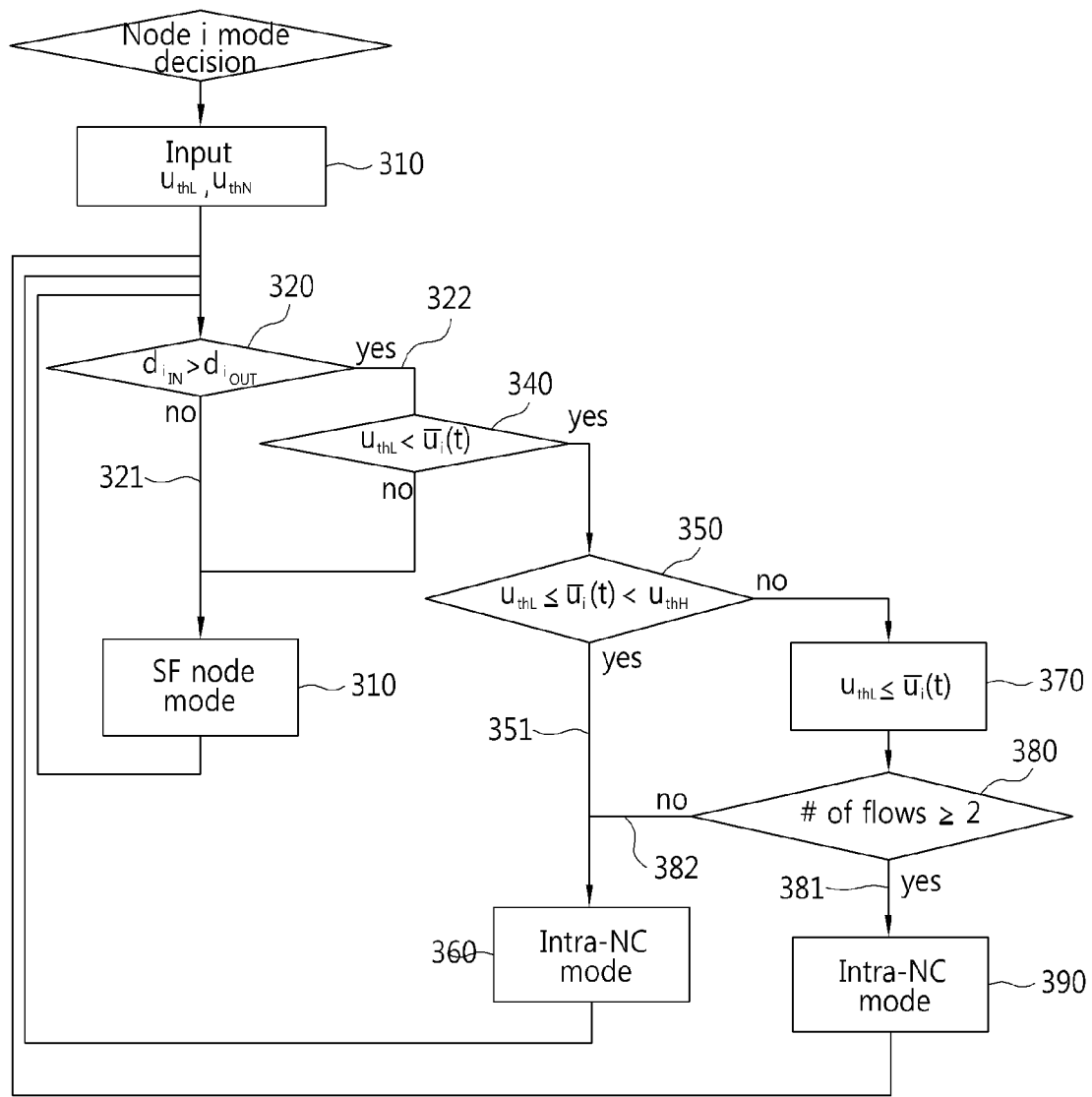
FIG. 3 illustrates a flow chart for describing a method for deciding a network coding method based on link utilization in a network node according to the exemplary embodiment of the present invention.

FIG. 3 illustrates a flow chart for describing a method for deciding a network coding method based on link utilization in a network node according to the exemplary embodiment of the present invention.

At this point, a measurement value $\overline{u_i}(t)$ corresponds to an average utilization, which measures the utilization of an output link of node i for a time period t. A detailed calculation of the utilization may be made by using the above-described Equation 1.

$$\overline{u_i}(t) = \frac{1}{n} \sum_{j=1}^{n} \frac{v_{l_j}(t)}{c_{l_j}} \quad \text{Equation 1}$$

Herein, i may represent a node, t may indicate a measurement time, n may represent a number of nodes, $c_{l_j}$ may indicate a capacity of a $j^{th}$ output link being connected to node i, and $v_{l_j}(t)$ may represent a traffic amount transmitted to the $j^{th}$ output link being connected to node i. Therefore, according to the equation, may represent an average utilization of node i during a time period t.

Referring to FIG. 3, in step (310), an output link utilization reference value of a predetermined network intermediate node may be inputted. Herein, the output link utilization reference value of the network intermediate node may include a low threshold value $u_{thL}$ and a high threshold value $u_{thH}$. Accordingly, in step (320), all connected input link capacity $d_{iIn}$ may be compared with output link capacity $d_{iOUT}$. In case $d_{iIN}$ is smaller than $d_{iOUT}$ (321), since the output link capacity of the node is greater than the input link capacity of the network node, the node is fully capable of accommodating the traffic. Therefore, in step (330), the store-and-forward method may be performed.

In step (340), the average utilization $\overline{u_i}(t)$ of the output link of the node may be compared with the low threshold value $u_{thL}$. If $d_{iIn}$ is greater than $d_{iOUT}$ (322), and if the average utilization $\overline{u_i}(t)$ of the output link of the node is smaller than $u_{thL}$ (341), although a large amount of traffic is flown into node i, since this state can be fully accommodated by the output link of node i, the utilization level of the output link is not high. In this case, the burden that is generated by applying network coding may be greater than the effect that is yielded by applying network coding. Therefore, in step (330), the store-and-forward method, which does not adopt network coding, may be performed.

In step (350), the average utilization $\overline{u_i}(t)$ of the output link of the node may be compared with the low threshold value $u_{thL}$ and the high threshold value $u_{thH}$. If $d_{iIN}$ is greater than $d_{iOUT}$ (322), and if the average utilization $\overline{u_i}(t)$ of the node i has a value ranging between $u_{thL}$ and $u_{thH}$ (351), since a large amount of traffic is flown into node i, the output link utilization of node i may be high but may be smaller than $u_{thL}$ (i.e., does not exceed $u_{thL}$). Accordingly, since the amount of traffic flown into node i is not excessive, the application of network coding may generate less burden. Therefore, in step (360), the intra-session network coding method may be applied.

In step (370), the average utilization $\overline{u_i}(t)$ of the output link of the node may be compared with the high threshold value $u_{thH}$. If $d_{iIN}$ is greater than $d_{iOUT}$ (322), and if the average utilization $\overline{u_i}(t)$ of the node i is greater than $u_{thH}$, since the amount of traffic flown into node i is too excessive, the output link utilization of node i becomes greater than $u_{thH}$. As described above, if an amount of traffic flown into the node is consistently flown into the node, the performance of the node may be degraded, thereby causing difficulty in smoothly providing services. Therefore, in this case, an inter-session network coding method, which provides high transmission efficiency via network coding, may be applied. At this point, in step (380), the number of traffic flows being flown into the node may be verified. In order to apply the inter-session network coding method, two or more traffic flows being flown into the node should exist. In case the number of traffic flows is equal to or more than 2 (381), in step (390), the inter-session network coding method may be applied. Conversely, in case the number of traffic flows is equal to 1 (382), in step (360), the intra-session coding method may be applied.

As shown in the flow chart of FIG. 3, a process of deciding the network coding application method of node i may be repeated in accordance with a pre-decided cycle period. Additionally, the network coding method may be decided and applied by adapting to a network situation, which is consistently changing. Furthermore, by respectively performing the above-described procedure, each of the network nodes may independently decide its own network coding application method.

Figure 4:
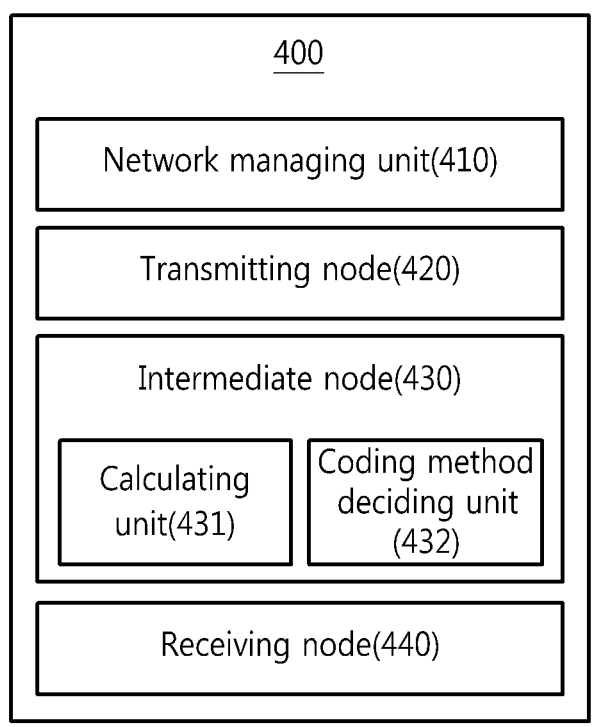
FIG. 4 illustrates a drawing for describing an apparatus for deciding a network coding method based on link utilization according to an exemplary embodiment of the present invention.

FIG. 4 illustrates a drawing for describing an apparatus 400 for deciding a network coding method based on link utilization according to an exemplary embodiment of the present invention. The apparatus for deciding a network coding method based on link utilization may include a network managing unit 410, a transmitting node 420, an intermediate node 430, and a receiving node 440.

The network managing unit 410 may set up an output link utilization reference value of a network intermediate node and notify the set up reference value to all network nodes and may, then, control the network coding method. The network managing unit 410 may control all nodes in accordance with a network coding method, which is decided by a coding method deciding unit 432 of the intermediate node 430. Thereafter, the network managing unit 410 may change the network coding method by reflecting an average utilization of the output link for each node, which is consistently updated, and by repeating the reflected average utilization in accordance with a pre-decided cycle period.

The intermediate node 430 may calculate the average utilization of the output link for each network node. And, then, after comparing the calculated average utilization with the reference value, the intermediate node 430 may decide the network coding method. Additionally, the intermediate node may receive the transmitted packet for a pre-decided period of time and may divide the received packet based upon a flow. Then, after encoding the divided packet, the intermediate node may transmit the encoded divided packet.

The intermediate node 430 may include a calculating unit 431 and a coding method deciding unit 432.

The calculating unit 420 may calculate an average utilization of the output link of each network node.

The calculating unit 420 may calculate the average utilization of the output link of each network node by using the above-described Equation 1.

$$\overline{u_i}(t) = \frac{1}{n} \sum_{j=1}^{n} \frac{v_{l_j}(t)}{c_{l_j}}$$ Equation 1

Herein, i may represent a node, t may indicate a measurement time, n may represent a number of nodes, $c_{l_j}$ may indicate a capacity of a $j^{th}$ output link being connected to node i, and $v_{l_j}(t)$ may represent a traffic amount transmitted to the $j^{th}$ output link being connected to node i. Therefore, according to the equation, $\overline{u_i}(t)$ may represent an average utilization of node i during a time period t. The calculating unit 420 may consistently update the average utilization of the output link for each node. And, by reflecting an average utilization of the output link for each node, which is consistently updated as described above, the network managing unit 410 may change the network coding method by repeating the reflected average utilization in accordance with a pre-decided cycle period.

The coding method deciding unit 432 may decide the network coding method by comparing the average utilization with the reference value. The coding method deciding unit 432 may decide a network coding method in accordance with the average utilization of the output link for each network node. Among the set up reference values, if the average utilization value of the output link for each network node is smaller than the low threshold value, a coding method that does not adopt network coding may be applied. For example, the coding method that does not adopt network coding may correspond to a store-and-forward method. Additionally, among the set up reference values, if the average utilization value of the output link for each network node is greater than the low threshold value and smaller than the high threshold value, since the traffic amount maintains an adequate state, a coding method encoding only packets that belong to the same flow may be applied. For example, a coding method encoding only the packets that belong to the same flow may correspond to the intra-session network coding method. Furthermore, among the set up reference values, if the average utilization value of the output link for each network node is greater than the high threshold value, a coding method controlling an excessive traffic amount may be applied. For example, the coding method controlling the excessive traffic amount may correspond to the inter-session network coding method. At this point, when two or more traffic flows exist, the coding method deciding unit 432 may apply the inter-session coding method, and, when one traffic flow exists, the coding method deciding unit 432 may apply the intra-session network coding method.

The transmitting node 420 may newly encode the initial (or original) content in order to perform network coding and may, then, transmit the processed packet. In other words, the transmitting node 420 may generate and transmit packets.

Finally, the receiving node 440 may receive the transmitted packet and may recover the initial content. In other words, the receiving node 440 may receive and decode packets.

As described above, the method and apparatus for deciding a network coding method based on link utilization, which are proposed in the present invention, have the following advantages. First of all, instead of having all nodes within the network perform network coding, network coding may be partially applied to some of the network nodes that can yield high effects when performing network coding. Accordingly, additional cost for a storage space of network coding, complexity, overhead respective to cost for enhancing node performance, and so on, may be reduced. Additionally, among all network nodes, by having some of the optimal nodes perform network coding based upon the output link utilization of a node, the processing amount of network coding may be increased. Furthermore, by deciding the network coding method in accordance with a network situation, and by applying the decided network coding method, the effects of each network coding method and the overhead may be controlled. Finally, the process of deciding the network coding method may be easily applied, since the network coding method can be independently performed based upon the respective utilization threshold values, without requiring any overall network controlling procedures or information exchange procedures to be performed.

The above-described device according to the exemplary embodiment of the present invention may be realized in the form of a hardware component, a software component, and/or a combination of a hardware component and a software component. For example, the device and corresponding components according to the above-described exemplary embodiments of the present invention may be realized by using at least one or more universal computers or special-purpose computers, such as a processor, a controller, an arithmetic logic unit (ALU), a digital signal processor, a field programmable array (FPA), a programmable logic unit (PLU), a microprocessor, or any type of device that can execute and respond to an instruction (or command). A processing device may execute an operating system (OS) and at least one or more software application, which is executed within the operating system (OS). Additionally, the processing device may respond to the execution of a software application, so as to access, store, manipulate, process, and generate data. In order to facilitate and simplify the understanding of the present invention, the present invention may be described to include only one processing device. However, it will be apparent to anyone skilled in the art that the processing device may include a plurality of processing elements and/or may include multiple types of processing elements. For example, the processing device may include multiple processors, or the processing device may include one processor and one controller. Additionally, other processing configuration, such as a parallel processor, may be configured herein.

The software may include a computer program, a code, an instruction, or a combination of one or more of the above. And, the software may configure a processing device, so that the processing device can be operated as intended, or the software may independently or collectively instruct (or command) the processing device. In order to be interpreted by the processing device, or in order to provide an instruction or data to the processing device, the software and/or data may be permanently or temporarily embodied in any type of machine, a component, a physical equipment (or device), a virtual equipment, a computer storage medium or device, or a transmitted signal wave. Since the software is dispersed (or scattered) within a computer system being connected to a network, the software may be stored or executed by using in a dispersion method. The software and data may be stored in one or more computer-readable recording media.

The method according to the exemplary embodiment of the present invention may be realized in a program command (or instruction) format that may be executed by using diverse computing means, so as to be recorded in a computer-readable medium. Herein, the computer-readable medium may independently include a program command (or instruction), a data file, a data structure, and so on, or may include a combination of the same. The program command being recorded in the medium may correspond to a program command that is specifically designed and configured for the exemplary embodiments of the present invention, or the program command may correspond to a program command that is disclosed and available to anyone skilled in or related to computer software. Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the exemplary embodiment of the present invention, and vice versa.

It will be apparent to those skilled in the art that various modifications and variations can be made in the present invention without departing from the spirit or scope of the inventions. For example, the above-described techniques may be executed in an order different from that described in the description of the present invention, and/or the components of the above-described system, structure, equipment (or device), circuit, and so on, may be combined in a format different that of the above-described method according to the present invention, and an adequate result may be achieved even if the above-described components of the present invention are replaced by any other component or its equivalent.

Thus, it is intended that the present invention covers other realizations and other embodiments of this invention provided they come within the scope of the appended claims and their equivalents.

What is claimed is:

1. A method for deciding a network coding method, comprising:
    a step of setting up an output link utilization reference value of a network intermediate node;
    a step of calculating an average utilization of output links for each network intermediate node;
    a step of deciding a network coding method in accordance with the average utilization of the output link for each network intermediate node;
    a step of consistently updating the average utilization of the output link for each network intermediate node; and
    a step of changing the network coding method, when a value of the average utilization value is changed,
    wherein, in the step of changing the network coding method, when a value of the average utilization value is changed, the network coding method is changed by reflecting the average utilization of the output link for each network intermediate node, which is consistently updated, and by repeating the reflected average utilization in accordance with a pre-decided cycle period.

2. The method of claim 1, wherein, in the step of setting up an output link utilization reference value of a network intermediate node, a low threshold value and a high threshold value of the output link utilization of the network intermediate node are set up, and wherein the set up values are notified to all network nodes.

3. The method of claim 1, wherein, in the step of calculating an average utilization of output links for each network intermediate node, the average utilization is calculated by using the equation shown below:

$$\overline{u_i}(t) = \frac{1}{n}\sum_{j=1}^{n}\frac{v_{l_j}(t)}{c_{l_j}},$$

wherein i represents a node, t indicates a measurement time, n represents a number of nodes, $c_{l_j}$ indicates a capacity of a $j^{th}$ output link being connected to node i, and $v_{l_j}(t)$ represents a traffic amount transmitted to the $j^{th}$ output link being connected to node i.

4. The method of claim 1, wherein, in the step of deciding a network coding method in accordance with the average utilization of the output link for each network intermediate node, if the average utilization value of the output link for each network intermediate node is smaller than a low threshold value, a coding method that does not adopt network coding is applied.

5. The method of claim 4, wherein the coding method that does not adopt network coding corresponds to a store-and-forward method.

6. The method of claim 1, wherein, in the step of deciding a network coding method in accordance with the average utilization of the output link for each network intermediate node, if the average utilization value of the output link for each network intermediate node is greater than a low threshold value and smaller than a high threshold value, since the traffic amount maintains an adequate state, a coding method encoding only packets that belong to the same flow is applied.

7. The method of claim 6, wherein the coding method encoding only the packets belonging to the same flow corresponds to an intra-session network coding method.

8. The method of claim 1, wherein, in the step of deciding a network coding method in accordance with the average utilization of the output link for each network intermediate node, if the average utilization value of the output link for each network node is greater than a high threshold value, a coding method controlling an excessive traffic amount is applied.

9. The method of claim 8, wherein the coding method controlling the excessive traffic amount corresponds to an inter-session network coding method.

10. The method of claim 9, wherein the inter-session coding method is applied when two or more traffic flows exist, and wherein the intra-session network coding method is applied when one traffic flow exists.

11. The method of claim 1, wherein each network intermediate node independently decides the network coding method.

12. An apparatus for deciding a network coding method, comprising:
a network managing unit configured to set up an output link utilization reference value of a network intermediate node and to notify the set up reference value to all network nodes, thereby controlling the network coding method;
a transmitting node configured to newly encode initial content in order to perform network coding and to transmit the processed packet;
an intermediate node configured to calculate an average utilization of an output link for each network intermediate node and to decide a network coding method after comparing the calculated average utilization with the reference value; and
a receiving node configured to receive the transmitted packet and to recover the initial content,
wherein the intermediate node receives the transmitted packet for a pre-decided period of time, divides the received packet based upon a flow, and, after encoding the divided packet, transmits the encoded divided packet.

13. The apparatus of claim 12, wherein the intermediate node further comprises:
a calculating unit configured to calculate an average utilization of the output link of each network intermediate node; and
a coding method deciding unit configured to decide the network coding method by comparing the average utilization with the reference value.

14. The apparatus of claim 13, wherein the calculating unit calculates the average utilization by using the equation shown below:

$$\overline{u_i}(t) = \frac{1}{n}\sum_{j=1}^{n}\frac{v_{l_j}(t)}{c_{l_j}},$$

wherein i represents a node, t indicates a measurement time, n represents a number of nodes, $c_{l_j}$ indicates a capacity of a $j^{th}$ output link being connected to node i, and $v_{l_j}(t)$ represents a traffic amount transmitted to the $j^{th}$ output link being connected to node i.

15. The apparatus of claim 13, wherein the coding method deciding unit decides the network coding method in accordance with the average utilization of the output link of each network intermediate node.

16. The apparatus of claim 15, wherein the coding method deciding unit applies a coding method that does not adopt network coding, if the average utilization value of the output link for each network intermediate node is smaller than a low threshold value.

17. The apparatus of claim 16, wherein the coding method that does not adopt network coding corresponds to a store-and-forward method.

18. The apparatus of claim 15, wherein the coding method deciding unit applies a coding method encoding only packets that belong to the same flow, if the average utilization value of the output link for each network intermediate node is greater than a low threshold value and smaller than a high threshold value, since the traffic amount maintains an adequate state.

* * * * *